US010524192B2

(12) United States Patent
Kumabe et al.

(10) Patent No.: US 10,524,192 B2
(45) Date of Patent: Dec. 31, 2019

(54) MOBILE OBJECT COMMUNICATION SYSTEM AND SERVICE PROVISION DEVICE (71) Applicant: DENSO CORPORATION, Kariya, Aichi-pref. (JP)

(72) Inventors: Seigou Kumabe, Kariya (JP); Takahisa Yamashiro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 28 days.

(21) Appl. No.: 15/754,515

(22) PCT Filed: Aug. 22, 2016

(86) PCT No.: PCT/JP2016/074310
§ 371 (c)(1),
(2) Date: Feb. 22, 2018

(87) PCT Pub. No.: WO2017/033875
PCT Pub. Date: Mar. 2, 2017

(65) Prior Publication Data
US 2018/0249404 A1 Aug. 30, 2018

(30) Foreign Application Priority Data

Aug. 26, 2015 (JP) .................. 2015-167057

(51) Int. Cl.
*H04W 48/10* (2009.01)
*H04W 4/48* (2018.01)
(Continued)

(52) U.S. Cl.
CPC ............ *H04W 48/10* (2013.01); *H04W 4/40* (2018.02); *H04W 4/48* (2018.02); *H04W 4/50* (2018.02);
(Continued)

(58) Field of Classification Search
None
See application file for complete search history.

(56) References Cited

U.S. PATENT DOCUMENTS 5,949,776 A * 9/1999 Mahany ............. G06K 7/10702
370/338
8,462,704 B2 6/2013 Hu
(Continued)

OTHER PUBLICATIONS

U.S. Appl. No. 15/755,585, filed Feb. 27, 2018, Kumabe et al.
U.S. Appl. No. 15/756,992, filed Mar. 2, 2018, Kumabe et al.

*Primary Examiner* — Andrew C Oh
(74) *Attorney, Agent, or Firm* — Harness, Dickey & Pierce, P.L.C.

(57) ABSTRACT

A mobile object communication system includes a mobile object side device used in a mobile object and a service provision device located outside the mobile object. The service provision device performs a communication with the mobile object side device for providing a predetermined service using one of multiple service channels, and transmits, using the control channel, service start information, which is required for starting the communication using the service channel and indicates the service channel used in the communication. The service provision device designates a communication method for performing the communication with the mobile object side device using the service channel indicated by the service start information. The service provision device transmits the service start information designating an immediate start method in a latter half of the control channel time period.

4 Claims, 6 Drawing Sheets (51) Int. Cl.
   *H04W 4/50*     (2018.01)
   *H04W 74/00*    (2009.01)
   *H04W 72/04*    (2009.01)
   *H04W 4/40*     (2018.01)
   *H04L 29/08*    (2006.01)

(52) U.S. Cl.
   CPC ....... *H04W 72/042* (2013.01); *H04W 74/002* (2013.01); *H04L 67/12* (2013.01)

(56) References Cited

U.S. PATENT DOCUMENTS

| | | | | |
|---|---|---|---|---|
| 8,843,390 B2* | 9/2014 | Kang | ................... | G07B 15/063 340/928 |
| 9,147,294 B1* | 9/2015 | Weinfield | ............... | G07C 5/008 |
| 2008/0232309 A1* | 9/2008 | McNew | .................. | H04L 47/14 370/329 |
| 2008/0232433 A1* | 9/2008 | McNew | ................ | H04W 28/18 375/140 |
| 2010/0031042 A1* | 2/2010 | Di Crescenzo | ..... | H04L 63/0869 713/169 |
| 2011/0141970 A1* | 6/2011 | Juan | ...................... | H04W 36/06 370/328 |
| 2011/0294447 A1* | 12/2011 | Hu | ........................ | H04W 72/00 455/154.1 |
| 2012/0059689 A1* | 3/2012 | Kang | ..................... | G07B 15/02 705/13 |
| 2012/0093091 A1* | 4/2012 | Kang | ..................... | H04W 4/90 370/329 |
| 2012/0149389 A1* | 6/2012 | Lin | ..................... | H04W 74/002 455/456.1 |
| 2012/0317211 A1* | 12/2012 | Guo | ........................ | H04L 65/605 709/206 |
| 2014/0195102 A1* | 7/2014 | Nathanson | ........... | G07C 5/0808 701/31.4 |
| 2014/0274182 A1* | 9/2014 | Menzel | ................ | H04B 7/0871 455/509 |
| 2015/0109962 A1* | 4/2015 | Liao | ........................ | H04L 45/04 370/254 |
| 2015/0195827 A1* | 7/2015 | Feng | ..................... | H04W 4/046 380/270 |
| 2015/0254987 A1* | 9/2015 | Altintas | ................. | G01C 21/34 701/409 |
| 2015/0282210 A1* | 10/2015 | Li | ......................... | H04W 76/14 455/436 |
| 2015/0305038 A1* | 10/2015 | Du | ........................ | H04W 48/12 370/329 |
| 2015/0358481 A1* | 12/2015 | Nagata | .................... | H04W 4/04 370/259 |
| 2016/0112856 A1* | 4/2016 | Han | ........................ | H04W 4/90 455/404.1 |
| 2016/0192433 A1* | 6/2016 | Deenoo | ................ | H04W 72/046 370/329 |
| 2016/0198315 A1* | 7/2016 | Sakata | .................... | H04W 4/08 370/329 |
| 2016/0286550 A1* | 9/2016 | Zhang | ............... | H04W 72/0446 |

\* cited by examiner

| MANAGE NO. | SERVICE | PSID | CH | COMMUNICATION MODE |
|---|---|---|---|---|
| 1 | A | 10 | SCH1 | EXTENSION |
| 2 | B | 20 | SCH4 | IMMEDIATE START |
| 3 | C | 14 | SCH5 | STANDARD (NOT SPECIFIED) |

# MOBILE OBJECT COMMUNICATION SYSTEM AND SERVICE PROVISION DEVICE

CROSS REFERENCE TO RELATED APPLICATIONS

This application is a U.S. National Phase Application under 35 U.S.C. 371 of International Application No. PCT/JP2016/074310 filed on Aug. 22, 2016 and published in Japanese as WO 2017/033875 A1 on Mar. 2, 2017. This application is based on and claims the benefit of priority from Japanese Patent Application No. 2015-167057 filed on Aug. 26, 2015. The entire disclosures of all of the above applications are incorporated herein by reference.

TECHNICAL FIELD

The present disclosure relates to a mobile object communication system including a service provision device that performs a wireless communication with a communication device used in a vehicle to provide a predetermined service to a driver or the like of the vehicle. The present disclosure also relates to the service provision device.

BACKGROUND ART

Up to now, WAVE (wireless access in vehicular environments) has been known as a communication standard for performing a wireless communication between a communication device (hereinafter referred to as "service provision device") managed by a service provider that provides a predetermined service and a communication device (hereinafter referred to as "vehicle side device") used in a vehicle (for example, Patent Literature 1).

In the WAVE, the service provision device and the vehicle side device perform the wireless communication with the use of two types of communication channels including a control channel (hereinafter referred to as CCH: control channel) and a service channel (hereinafter referred to as SCH: service channel). The SCH is a communication channel used for transmitting and receiving information for performing the provision and use of services. Multiple frequencies used as the SCH are prepared. In other words, multiple communication channels are prepared as service channels.

In addition, the CCH is a communication channel used for distributing a message (WSA: wave service advertisement) for initiating a communication between the vehicle side device and the service provision device with the use of the SCH, and so on. The WSA includes service type information indicating the type of services provided by the service provision device as a source of the WSA and channel information designating the SCH used for providing the service among the multiple SCHs.

The vehicle side device receives the WSA transmitted from the service provision device with the use of the CCH to grasp currently available services. The vehicle side device performs a communication with the service provision device that provides a service to be used with the use of the SCH indicated in the WSA corresponding to the service, to thereby use the service. The type of service to be used is registered in advance in the vehicle side device.

In addition, each communication device in the WAVE is set so as to implement a communication using the CCH and a communication using the SCH alternately at predetermined time intervals (for example, 50 milliseconds) as a basic communication pattern (which is taken as a standard method). Therefore, when using the service corresponding to the WSA received while carrying out the communication by the CCH, the vehicle side device starts the communication using the SCH indicated in the WSA at the time point when the communication using the CCH is ended after an elapse of a predetermined communication period.

For the sake of convenience, in the following description, the time period during which the communication using the control channel is scheduled to be carried out in the standard method is referred to as a CCH time period, and the time period during which the communication using the service channel is scheduled to be carried out is referred to as an SCH time period.

In the WAVE, various communication patterns other than the standard method described above are prepared as the communication patterns between the service provision device and the vehicle side device. For example, as the communication pattern other than the standard method, there is an immediate start method of starting the communication using the SCH shown in the WSA immediately upon receiving the WSA. Upon receiving the WSA for which the immediate start method is designated, the vehicle side device promptly terminates the communication by the CCH and starts the communication using the SCH indicated in the received WSA.

In the WSA, an area (hereinafter referred to as option area) for designating the communication pattern is provided, and the service provision device designates a desired communication pattern in the option area of the WSA so as to be communicatable with the vehicle side device by the designated communication pattern.

PRIOR ART LITERATURE

Patent Literature

Patent Literature 1: U.S. Pat. No. 8,462,704

SUMMARY OF INVENTION

The present disclosure is to provide a mobile object communication system and a service provision device capable of reducing a possibility that a mobile object side device fails to grasp an available service. In the present specification, the mobile object side device is a concept including a mobile device carried by a pedestrian and a vehicle side device.

According to an aspect of the present disclosure, a mobile object communication system includes a mobile object side device used in a mobile object and a service provision device located outside the mobile object in which the mobile object side device is used. The mobile object side device and the service provision device perform a communication in wireless manner using a control channel and multiple service channels. The control channel and the multiple service channels are defined by different frequencies from one another. A time period in which the communication using the control channel is performed is defined as a control channel time period, and a time period in which the communication using each of the multiple service channels is performed is defined as a service channel time period. The control channel time period and the service channel time period are set to be alternately switched. The service provision device includes a provision side service channel unit and a provision side control channel unit. The provision side service channel unit performs the communication with the mobile object side device and provides a predetermined service using one of the multiple service channels. The provision side control channel unit transmits, using the control channel, service start information indicating the one of the multiple service channels used in the communication for providing the predetermined service. The service start information includes information required for starting the communication between the service provision device and the mobile object side device using the one of the multiple service channels. The service provision device designates, in the service start information, a communication method of the communication with the mobile object side device using the one of the multiple service channels. The communication method includes a standard communication method and an immediate start method. In the standard communication method, the service provision device starts the communication with the mobile object side device using the one of the multiple service channels at a start time of the service channel time period. In the immediate start method, the service provision device controls the mobile object side device to immediately start the communication using the one of the multiple service channels as soon as the mobile object side device receives the service start information. The provision side control channel unit transmits the service start information designating the immediate start method in a latter half of the control channel time period.

With the configuration described above, the service provision device transmits the service start information that designates the immediate start method in the latter half of the control channel time period. According to the above configuration, in a situation where the multiple pieces of service start information arrive at the mobile object side device, a possibility that another service start information arrives at the mobile object side device after the service start information that designates the immediate start method can be reduced.

Therefore, according to the configuration described above, the possibility that the mobile object side device fails to grasp the service available for the mobile object side device can be reduced.

According to another aspect of the present disclosure, a service provision device that performs a communication in wireless manner with a mobile object side device used in a mobile object is provided. The service provision device is located outside the mobile object in which the mobile object side device is used, and the service provision device is used in a mobile object communication system in which the mobile object side device and the service provision device perform the communication in wireless manner using a control channel and a plurality of service channels. The control channel and the plurality of service channels are defined by different frequencies from one another. A time period in which the communication using the control channel is performed is defined as a control channel time period, and a time period in which the communication using each of the plurality of service channels is performed is defined as a service channel time period. The control channel time period and the service channel time period are set to be alternately switched. The service provision device comprises: a provision side service channel unit performing the communication with the mobile object side device and providing a predetermined service using one of the plurality of service channels; and a provision side control channel unit transmitting, using the control channel, service start information required for starting the communication between the service provision device and the mobile object side device using the one of the plurality of service channels. The service provision device designates, in the service start information, a communication method of the communication with the mobile object side device using the one of the plurality of service channels. The communication method includes a standard communication method and an immediate start method. In the standard communication method, the service provision device starts the communication with the mobile object side device using the one of the plurality of service channels at a start time of the service channel time period. In the immediate start method, the service provision device controls the mobile object side device to immediately start the communication using the one of the plurality of service channels as soon as the mobile object side device receives the service start information. The provision side control channel unit transmits the service start information designating the immediate start method in a latter half of the control channel time period.

The service provision device described above is directed to a communication device having a configuration for functioning as the service provision device in the mobile object communication system described above. Therefore, according to the configuration described above, the same advantages as those in the mobile object communication system described above can be obtained.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

In a system (hereinafter referred to as a mobile object communication system) in which a service provision device and a vehicle side device communicate with each other according to WAVE standard, a situation in which multiple WSAs corresponding to respective multiple types of services are transmitted to a vehicle side device in one CCH time period is supposed. For example, there are a case in which multiple service provision devices exist in the vicinity of the vehicle side device, a case in which one service provision device is compatible with plural types of services, and so on.

In such a situation where the multiple WSAs is received in one CCH time period, it is preferable that the vehicle side device receives the multiple WSAs first, grasps all available services in the multiple WSAs, and then leverages the service with the highest priority.

The timing when the service provision device transmits the WSA in the CCH time period is not defined in the current communication. In other words, in the CCH time period, the service provision device can transmit the WSA designating various communication patterns at any timing. Therefore, the vehicle side device may receive the WSA for which the immediate start method is designated at the beginning of the CCH time period.

In a situation where the multiple WSAs are transmitted toward the vehicle side device in one CCH time period, when the vehicle side device receives the WSA designating the immediate start method at the beginning of the CCH time period, the vehicle side device cannot receive the WSAs distributed after the reception time of the WSA designating the immediate start method. This is because when the vehicle side device receives the WSA designating the immediate start method, the vehicle side device promptly switches from the communication using the CCH to the communication using the SCH corresponding to the WSA designating the immediate start method.

In other words, in the situation where the multiple WSAs are transmitted toward the vehicle side device in one CCH time period, the vehicle side device may fail to grasp the full range of services available at the time point.

In the above description, the problem is described assuming a case in which the vehicle side device performs the communication with the service provision device according to the WAVE standard. The communication partner of the service provision device is not limited to the vehicle side device. A mobile device carried by a pedestrian may perform the communication with the service provision device according to the WAVE standard. Even in that case, the same problem as that of the vehicle side device arises.

The present disclosure has been made in view of the above circumstances, and an object of the present disclosure is to provide a mobile object communication system and a service provision device capable of reducing a possibility that a mobile object side device fails to grasp all of the available services. In the present specification, the mobile object side device is a concept including a mobile device carried by a pedestrian and a vehicle side device.

(Embodiments)

Figure 1:
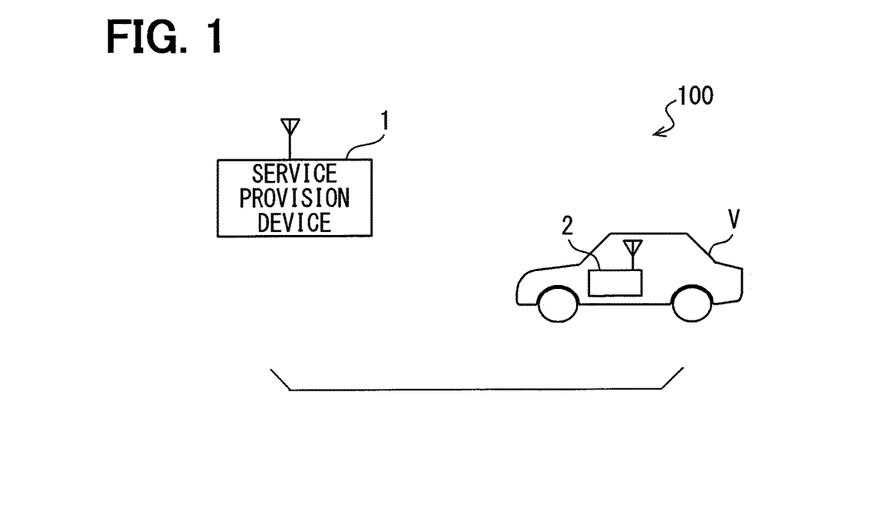
FIG. 1 is a block diagram illustrating an example of a schematic configuration of a mobile object communication system according to the present embodiment.

Hereinafter, embodiments of the present invention will be described with reference to the accompanying drawings. FIG. 1 is a diagram illustrating an example of a schematic configuration of a mobile object communication system 100 according to the present embodiment. As shown in FIG. 1, the mobile object communication system 100 includes a service provision device 1 which is a communication device managed by a service provider, and a vehicle side device 2 which is a communication device used in the vehicle V. In this example, the service provider is an entity (for example, a company, a shop, a public institution, and so on) that provides a predetermined service to a user using the vehicle side device 2.

In FIG. 1, only one service provision device 1 is shown for convenience. Alternatively, multiple service provision devices 1 may be provided in the entire mobile object communication system 100. In addition, multiple vehicle side devices 2 may be provided in the entire mobile object communication system 100.

The service provision device 1 and the vehicle side device 2 are configured to perform a wireless communication with each other according to the standard of WAVE (wireless access in vehicular environment). More specifically, one control channel and multiple (for example, six) service channels are allocated to the mobile object communication system 100 as communication channels. The control channel and the multiple service channels are defined by respective different frequency bands. The control channel and the multiple service channels may be realized with the use of frequencies belonging to a 5.8 GHz band, a 5.9 GHz band, and a 2.4 GHz band. It is needless to say that the control channel and the multiple service channels may be realized with the use of frequency bands other than above-described frequency bands.

The service channels are communication channels prepared for the vehicle side device 2 and the service provision device 1 to transmit and receive service provision information which is information for providing and using a predetermined service. Each service channel may be distinguished by a number (hereinafter referred to as a channel number) assigned to the service channel.

In addition, the control channel is a communication channel prepared for the service provision device 1 for distribution of a WSA (wave service advertisement), which is a message for the service provision device 1 and the vehicle side device 2 to start a communication with each other using a predetermined service channel, and so on. As will be described later, the WSA includes service type information indicating the type of service provided by the service provision device 1, usage channel information for designating a service channel used for providing a service among the multiple service channels, and so on.

The WSA includes an area (hereinafter referred to as an option area) for designating a communication mode when the service provision device 1 and the vehicle side device 2 perform the communication with each other using the service channel for providing and using the service. For example, the service provision device 1 designates a desired communication mode in the option area of the WSA, thereby being capable of communicating with the vehicle side device 2 in the designated communication mode.

The vehicle side device 2 receives the WSA delivered from the service provision device 1, thereby being capable of grasping a currently available service and the service channel to be connected for using the service, and so on.

The service provision device 1 and the vehicle side device 2 switch the communication channels (hereinafter referred to as transmission and reception channels) for transmission or reception in the respective communication devices provided in the own device, to thereby perform the communication by the control channel and the communication by the service channels with each other.

An identification code (hereinafter referred to as a device ID) for identifying each of the multiple communication devices is set in each of the communication devices provided in the mobile object communication system 100. The data transmitted by each communication device includes the device ID of the transmission device, and the communication device that has received the data can identify the transmission device according to the device ID included in the received data.

Next, a communication mode when the service provision device 1 and the vehicle side device 2 perform the communication under the WAVE protocol using the service channels will be described with reference to FIG. 2.

In the WAVE, a standard method, an immediate start method, and an extension method are defined as the communication modes when the service provision device 1 and the vehicle side device 2 perform the communication using the service channels. The service provider can employ any communication mode from those multiple communication modes. The standard method, the immediate start method, and the extension method correspond to methods called a normal method, an immediately method, and an extended method, respectively.

Figure 2:
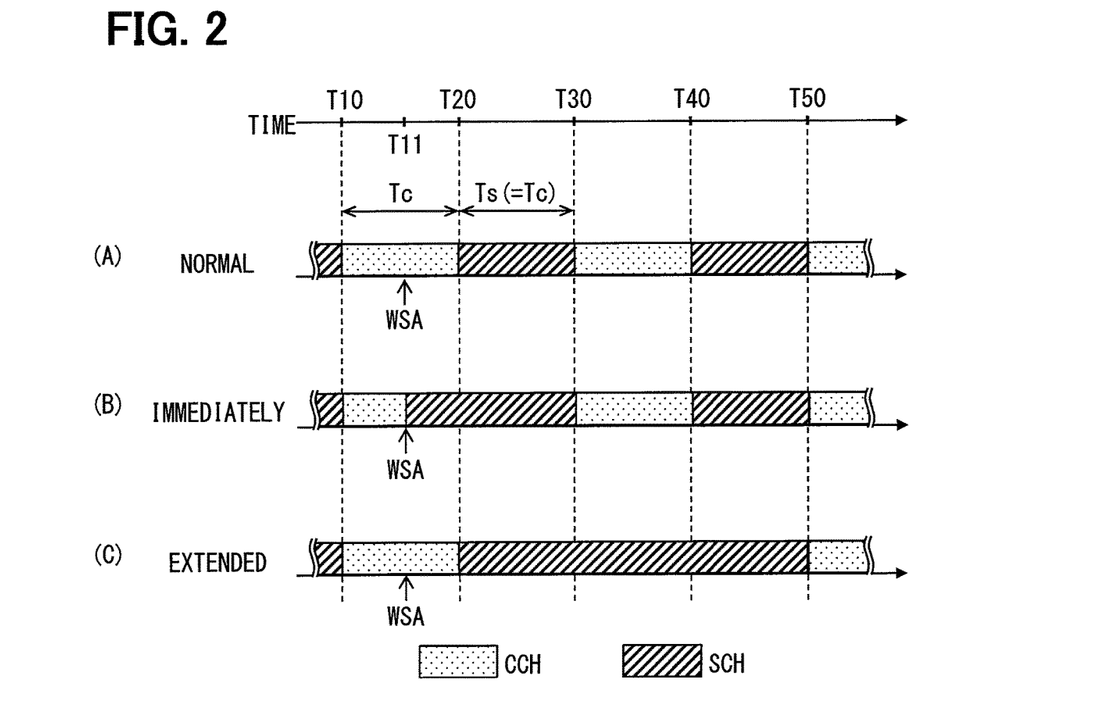
FIG. 2 is a diagram illustrating the types of communication modes that can be employed in WAVE.

FIG. 2 shows a conceptual diagram (A) indicating an example of a flow of communication performed by the service provision device 1 in the standard method. Basically, in the WAVE, a CCH time period, which is a time period in which the communication using the control channel is to be performed, and a SCH time period, which is a time period in which the communication using the service channels is to be performed, are alternately switched at predetermined time intervals as illustrated in (A) of FIG. 2. The CCH is an abbreviation for the control channel (control channel), and the SCH is an abbreviation for each service channel (service channel). The SCH time period corresponds to a service channel time period defined in the claims, and the CCH time period corresponds to a control channel time period.

For example, the service provision device 1 switches between the communication using the control channel and the communication using the service channels at predetermined time intervals (for example, 50 milliseconds). A duration Tc of the CCH time period and a duration Ts of the SCH time period may be appropriately designed. The CCH time period and the SCH time period are divided into multiple time slots as will be described later.

When the vehicle side device 2 has received the WSA notifying the service to be used by the vehicle side device 2 in a state where the transmission and reception channel is set as the control channel, the transmission and reception channel is set as the service channel indicated in the WSA at a timing when the CCH time period expires and the SCH time period starts. In other words, the vehicle side device 2 starts the communication with the service provision device 1 using the service channels at the timing when the SCH time period starts. Hereinafter, starting the communication using the predetermined service channel with the service provision device 1 is also expressed as opening the service channel.

For example, when the WSA corresponding to the service to be used is received at a time T11 in the CCH time period, a communication using the service channel indicated by the WSA corresponding to the service to be used is started at a time T20. In addition, when communication processing for providing and using the service has not been completed in one SCH time period, the communication is once switched back to the communication using the control channel, and the communication using the service channel is resumed in the next and subsequent SCH time periods. This standard method corresponds to an example of the standard communication method.

FIG. 2 also illustrates a conceptual diagram (B) which indicates the transition of the transmission and reception channel when the service provision device 1 and the vehicle side device 2 perform the communication with each other by the immediate start method. In the immediate start method, as soon as the vehicle side device 2 receives a WSA, the vehicle side device 2 starts the communication using the service channel indicated in the WSA. Upon receiving the WSA by which the immediate start method is designated, the vehicle side device 2 immediately terminates the communication using the control channel without waiting for the expiration of the CCH time period, and starts the communication using the service channel indicated by the received WSA.

When transmitting the WSA designating the immediate start method, the service provision device 1 promptly switches the transmission and reception channel set as the control channel to the transmission and reception channel set as the service channel corresponding to the WSA.

FIG. 2 also illustrates a conceptual diagram (C) which indicates the transition of the transmission and reception channel when the service provision device 1 and the vehicle side device 2 perform the communication by the extension method. The extension method is a method in which the vehicle side device 2 and the service provision device 1 continuously perform the communication using the service channel for a time longer than the time period Ts defined in advance. In this configuration, the start timing of the communication using the service channel is a timing at which the CCH time period expires and the SCH time period starts. Therefore, the extension method also corresponds to an example of the standard communication method.

When designating the extension method as the communication mode, the service provision device 1 may also designate the time period for continuing the communication using the service channel. Alternatively, the service provision device 1 may continue the communication using the service channel until completion of the communication for providing and using the service.

The communication modes exemplified above are examples of a communication mode between the service provision device 1 and the vehicle side device 2. In other words, the communication mode between the service provision device 1 and the vehicle side device 2 is not limited to the examples described above, and the communication may be performed in a mode other than the examples described above.

Next, the configuration and operation of the service provision device 1 will be described. In order to provide a predetermined service, the service provision device 1 performs the wireless communication with the vehicle side device 2 existing in the wireless communication area of the service provision device 1, transmits various kinds of information to the vehicle side device 2, and receives various kinds of information from the vehicle side device 2. The service provided by the service provision device 1 is, for example, an automatic toll collection service when traveling on a toll road, an automatic parking fee collection service at a time of parking, a traffic information distribution service, a position information notification service, an advertisement distribution service, and the like.

The service provision device 1 may be a roadside equipment attached to a roadside, or may be a portable roadside device. Further, the service provision device 1 may be mounted on the mobile object such as a vehicle. The service provision device 1 may be disposed at a position suitable for the content of the service to be provided by the service provision device 1.

For example, when the service provision device 1 provides a service (that is, a traffic information distribution service) for distributing real time traffic information, the service provision device 1 may be installed at an intersection, a roadside, or the like. In addition, when the service provision device 1 provides a drive-through type service, the service provision device 1 may be installed so as to provide a desired wireless communication area in the vicinity of an entrance of a store. As is well known, the drive-through type service is a service of providing a predetermined service, such as delivery of goods, and settlement of the service or the goods, without requiring the user to get off the vehicle.

In addition, the service provision device 1 may be provided at a position corresponding to the type of service to be provided, such as a parking lot or an entrance to a toll road. The wireless communication area of the service provision device 1 (in other words, an output of a radio wave transmitted from the service provision device 1) can be set according to the service provided by the service provision device 1.

Figure 3:
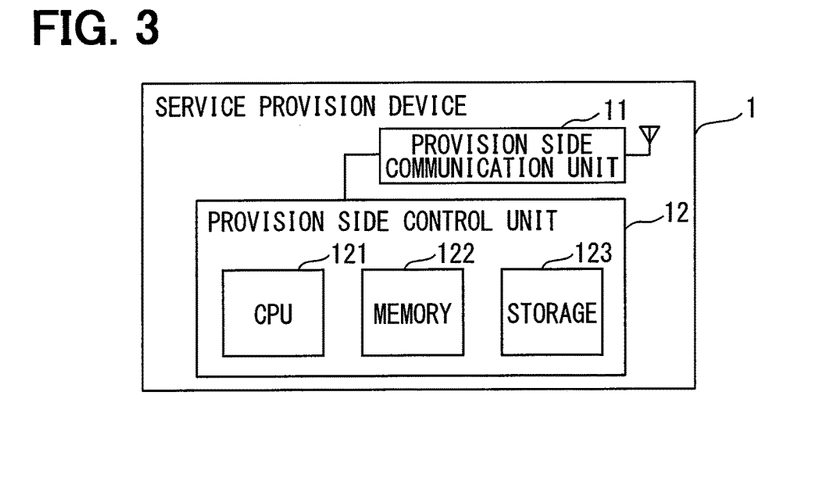
FIG. 3 is a block diagram illustrating an example of a schematic configuration of a service provision device.

As shown in FIG. 3, the service provision device 1 includes a provision side communication unit 11 and a provision side control unit 12. The provision side communication unit 11 and the provision side control unit 12 are connected to each other so as to be mutually communicatable.

The provision side communication unit 11 performs the wireless communication with the vehicle side device 2 existing in the wireless communication area of the service provision device 1. The provision side communication unit 11 demodulates a signal received from the vehicle side device 2 and outputs the demodulated signal to the provision side control unit 12, modulates data input from the provision side control unit 12, and further converts the modulated data into a radio wave, and transmits the radio wave.

The provision side communication unit 11 is configured so as to switch a communication channel, which is a transmission and reception channel, among the control channel and the multiple service channels. Both of the communication using the control channel and the communication using the service channel with the vehicle side device 2 are performed by the provision side communication unit 11. Among the control channel and the multiple service channels, the communication channel serving as the transmission and reception channel is switched based on an instruction from the provision side control unit 12.

The provision side control unit 12 is configured as a computer, and includes a CPU 121, a memory 122, a storage 123, an I/O, and a bus line that connects those components to each other. The memory 122 may be provided by a volatile memory such as a RAM, and functions as a calculation area for the CPU 121. The memory 122 also functions as a queue (hereinafter referred to as a transmission waiting queue) for storing the WSA waiting for transmission.

The storage 123 is a nonvolatile storage medium, and is provided by, for example, a flash memory, a ROM, or the like. The storage 123 stores a program (hereinafter referred to as a provision device program) for controlling a normal computer to function as the provision side control unit 12 in the present embodiment, the device ID allocated to the service provision device 1, and so on. Information for generating the WSA is also stored in the storage 123.

It should be noted that the provision device program described above may be stored in a non-transitory tangible storage medium such as a ROM. The CPU 121 executing the provision device program corresponds to execution of a method corresponding to the provision device program.

Figure 4:
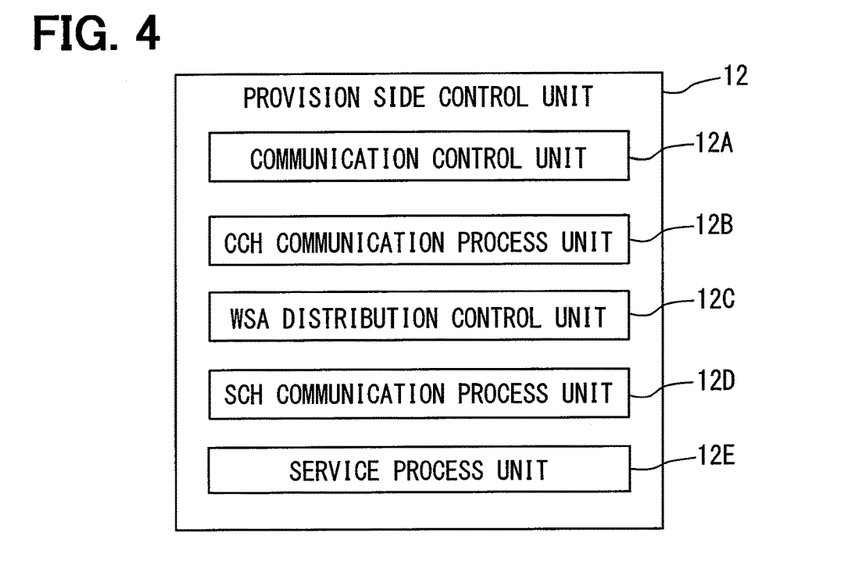
FIG. 4 is a block diagram illustrating an example of a schematic configuration of a provision side control unit.

As shown in FIG. 4, the provision side control unit 12 includes a communication control unit 12A, a CCH communication processing unit 12B, a WSA distribution control unit 12C, an SCH communication processing unit 12D, and a service processing unit 12E. These components are functional blocks to be implemented by execution of the provision device program described above. CCH in the name of each component indicates a control channel (control channel), and SCH indicates a service channel (service channel). A part of or all of the functions to be executed by the provision side control unit 12 may be realized in hardware manner by one or more ICs or the like.

The communication control unit 12A controls the operation of the provision side communication unit 11 and switches between the communication using the control channel and the communication using the service channel by switching the communication channels functioning as the transmission and reception channels. When the transmission and reception channel of the provision side communication unit 11 is set as the control channel, the communication control unit 12A operates the CCH communication processing unit 12B. When the transmission and reception channel of the provision side communication unit 11 is set as the service channel, the communication control unit 12A operates the SCH communication processing unit 12D.

Among the multiple service channels, the service channels used for providing the service are preliminarily determined according to the type of service to be provided or the like. When the communication control unit 12A controls the provision side communication unit 11 to perform the communication using the service channel, the communication control unit 12A sets the transmission and reception channel to the service channel corresponding to the service to be provided among the multiple service channels.

The CCH communication processing unit 12B performs the communication using the control channel in cooperation with the provision side communication unit 11. The CCH communication processing unit 12B generates the WSA and transmits the generated WSA to the provision side communication unit 11 by a broadcast method. The CCH communication processing unit 12B corresponds to a provision side control channel unit.

Figure 5:
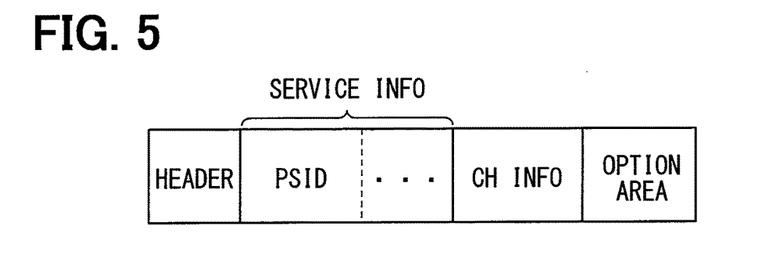
FIG. 5 is a diagram illustrating an example of a schematic configuration of WSA.

As shown in FIG. 5, the WSA includes a header, service information, channel information, and an option area. The header is information for recognizing that the received data is WSA in the vehicle side device 2 which is the receiving side device. For example, the header includes information indicating the version of the WAVE standard, information for distinguishing the WSA from other information such as service provision information, and the like.

The service information indicates the type of service provided by the service provision device 1. The service information indicates the type of service by an identification code (hereinafter referred to as PSID: Provider Service Identification) set for each service type. Upon receiving the WSA, the vehicle side device 2 refers to the service information included in the WSA, and can specify the type of service corresponding to the WSA. In other words, the vehicle side device 2 can specify the type of service provided by the service provision device 1 that is a source of the WSA.

The channel information indicates the channel number of the service channel via which the service provision device 1 provides the service among the multiple service channels. It should be noted that the service channel used for providing the service may be appropriately determined according to the service to be provided. Multiple services may be associated with the same service channel. Referring to the channel information, the vehicle side device 2 can specify the service channel to be used by the service provision device 1 for providing the service.

The option area indicates a communication mode when performing the communication using the service channel. The service provision device 1 can designate, using the option area, the communication mode in the communication using the service channel. For example, when adopting the immediate start method as the communication mode, the service provider stores information (for example, a prescribed bit string or flag) corresponding to the immediate start method in the option area. When the communication mode is not designated in the option area of the received WSA, the vehicle side device 2 may adopt the standard method. The WSA corresponds to service start information.

A timing at which the WSA generated by the CCH communication processing unit 12B is transmitted is controlled by the WSA distribution control unit 12C. Details of the WSA distribution control unit 12C will be described later. In addition, as a function of the CCH communication processing unit 12B, when the provision side communication unit 11 receives data transmitted from the vehicle side device 2 with the use of the control channel, the provision side communication unit 11 acquires the received data and transmits the acquired data to the service processing unit 12E.

The SCH communication processing unit 12D performs the communication using a predetermined service channel in cooperation with the provision side communication unit 11. The SCH communication processing unit 12D corresponds to a provision side service channel unit. The SCH communication processing unit 12D outputs the service provision information provided from the service processing unit 12E to the provision side communication unit 11 and controls the provision side communication unit 11 to transmit the information. The transmission method may be one of broadcast, unicast, and multicast, and the communication method to be used depends on the type of service. In addition, the SCH communication processing unit 12D acquires the data received by the provision side communication unit 11 through the communication using the service channel, and provides the data to the service processing unit 12E.

The service processing unit 12E performs processing for providing a predetermined service to the vehicle side device 2 disposed in the wireless communication area. Specifically, the service processing unit 12E generates the service provision information according to the service to be provided and provides the generated service provision information to the SCH communication processing unit 12D. Also, the service processing unit 12E performs processing (for example, generation of service provision information, etc.) according to data input from the SCH communication processing unit 12D.

The service provided by the service provision device 1 may be registered in advance in a storage 223 as a provision service list. The provision service list is data in which services provided by the service provision device 1 are listed. For each service provided by the service provision device 1, the provision service list includes information necessary for generating a WSA corresponding to the service.

Figure 6:
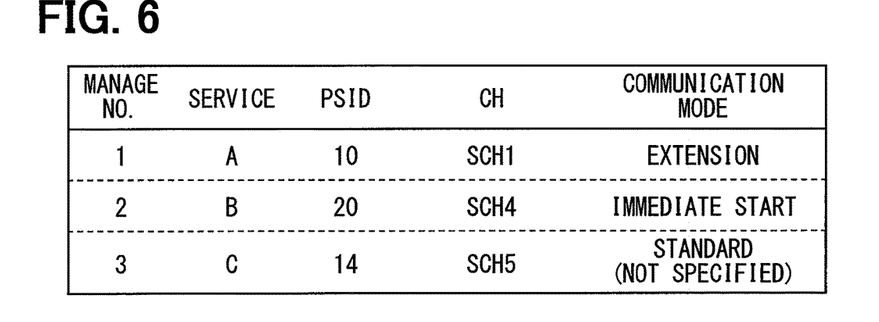
FIG. 6 is a diagram illustrating an example of the types of service provided by the service provision device.

For example, as shown in FIG. 6, each record of the service list stores associated information including the PSID of each service to be provided, the channel number of the service channel used for providing the service, and the type of the communication mode.

FIG. 6 is a diagram conceptually illustrating the contents of the service list registered in the service provision device 1 that provides the three types of services A, B, and C. In the example of FIG. 6, the PSID of a service A is 10, the channel number of the service channel used for providing the service A is 1 (SCH1 in the figure), and an extension method is designated as the communication mode.

In the present embodiment, service provision by the service provision device 1 to the vehicle side device 2 includes service provision by the service provision device 1 to a vehicle on which the vehicle side device 2 is mounted through the vehicle side device 2, and service provision by the service provision device to an occupant of the vehicle on which the vehicle side device 2 is mounted through the vehicle side device 2.

Next, the configuration and operation of the vehicle side device 2 will be described. Various vehicles traveling on the road, such as a passenger car, a bus, and a truck correspond to the vehicle V in which the vehicle side device 2 is used. Also, in FIG. 1, a four-wheeled vehicle is illustrated as the vehicle V, but the vehicle V may be a two-wheeled vehicle or a three-wheeled vehicle. The two-wheeled vehicle includes a bicycle.

In the present embodiment, the vehicle side device 2 is mounted on the vehicle V. In another embodiment, the vehicle side device 2 may be brought into the vehicle V by the user. The mounting of vehicle side device 2 on the vehicle V includes an example in which the vehicle side device 2 is fixed to the vehicle V and an example in which the vehicle side device 2 is detachably attached to a holder or the like disposed in the vehicle V. Hereinafter, the vehicle V on which the vehicle side device 2 is mounted is also referred to as a host vehicle.

Figure 7:
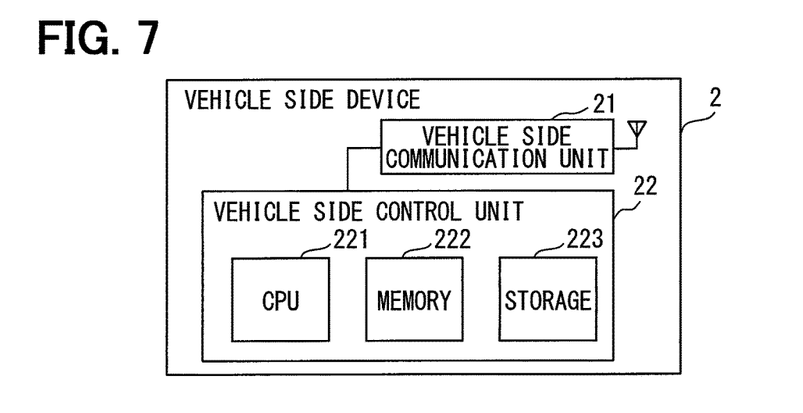
FIG. 7 is a block diagram illustrating an example of a schematic configuration of a vehicle side device.

As shown in FIG. 7, the vehicle side device 2 includes a vehicle side communication unit 21 and a vehicle side control unit 22. The vehicle side communication unit 21 and the vehicle side control unit 22 are connected to each other so as to enable mutual communication.

The vehicle side communication unit 21 demodulates a signal received by an antenna and outputs the demodulated signal to the vehicle side control unit 22, modulates data input from the vehicle side control unit 22, and further converts the modulated data into a radio wave, and transmits the radio wave. The vehicle side communication unit 21 switches a communication channel, which is a transmission and reception channel, among the control channel and the multiple service channels. Both of the communication using the control channel and the communication using the service channel with the service provision device 1 are performed through the vehicle side communication unit 21. Among the control channel and the multiple service channels, the communication channel serving as the transmission and reception channel is switched based on an instruction from the vehicle side control unit 22.

The vehicle side control unit 22 is configured as a computer, and includes a CPU 221, a memory 222, a storage 223, an I/O, and a bus line that connects those components to each other. The memory 222 may be provided by a volatile memory such as a RAM. The memory 222 functions as a calculation area for the CPU 221.

The storage 223 is a nonvolatile storage medium, and is provided by, for example, a flash memory, a ROM, or the like. The storage 223 stores a program (hereinafter referred to as a vehicle program) for controlling a normal computer to function as the vehicle side control unit 22 in the present embodiment, the device ID allocated to the vehicle side device 2, and so on.

It should be noted that the vehicle program described above may be stored in a non-transitory tangible storage medium such as a ROM. The CPU 221 executing the appropriate program corresponds to execution of a method corresponding to the appropriate program.

The PSIDs of the services that are available (in other words, usable) by the vehicle side device 2 are registered in the storage 223. In addition, for each service, a priority indicating a usage recommendation level is set, and in the present embodiment, data indicating the priority of each PSID is stored in the storage 223. The priority of each service may be set by an administrator of the mobile object communication system 100.

Figure 8:
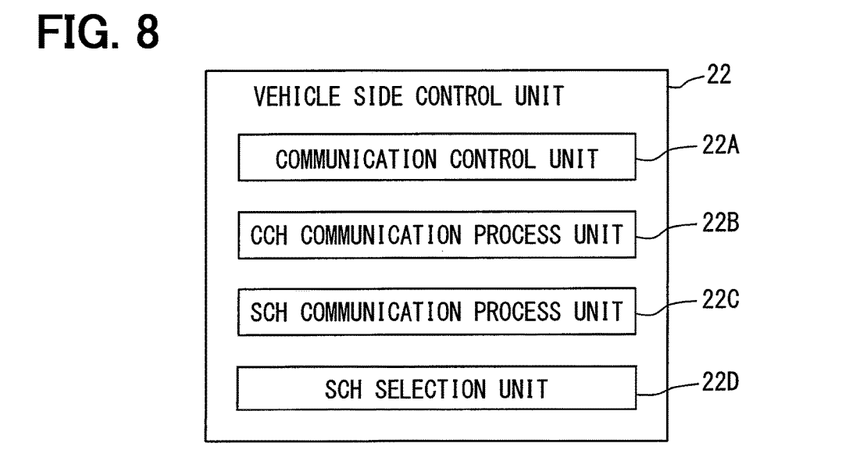
FIG. 8 is a block diagram illustrating an example of a schematic configuration of a vehicle side control unit.

As shown in FIG. 8, as functional blocks to be implemented by execution of the vehicle program, the vehicle side control unit 22 includes a communication control unit 22A, a CCH communication processing unit 22B, an SCH communication processing unit 22C, and an SCH selection unit 22D. A part of or all of the functions to be executed by the vehicle side control unit 22 may be realized in hardware manner by one or more ICs or the like.

The communication control unit 22A controls the operation of the vehicle side communication unit 21 and switches between the communication using the control channel and the communication using the service channel by switching the communication channel, which functions as the transmission and reception channel. When the transmission and reception channel of the vehicle side communication unit 21 is set as the control channel, the communication control unit 22A operates the CCH communication processing unit 22B. When the transmission and reception channel of the vehicle side communication unit 21 is set as the service channel, the communication control unit 22A operates the SCH communication processing unit 22C.

Among the multiple service channels, the service channel set by the communication control unit 22A as the transmission and reception channel is a service channel corresponding to the service to be used. The service channel corresponding to the service to be used is a service channel designated in the WSA that has notified the service to be used.

The CCH communication processing unit 22B performs the communication using the control channel in cooperation with the vehicle side communication unit 21. In other words, the CCH communication processing unit 22B sequentially acquires the WSA received by the vehicle side communication unit 21 through the communication using the control channel, and provides the acquired WSA to the service selection unit 224. The CCH communication processing unit 22B corresponds to a mobile object side control channel unit.

The SCH communication processing unit 22C performs the communication using a predetermined service channel in cooperation with the vehicle side communication unit 21. The service channel used in this example is a service channel corresponding to the service to be used. The SCH communication processing unit 22C acquires the service provision information transmitted from the service provision device 1. The SCH communication processing unit 22C corresponds to a mobile object side service channel unit.

When the acquired service provision information is information requesting the vehicle side device 2 to return the information required for the service provision device 1 to provide the service, the SCH communication processing unit 22C generates data indicating the required information, and returns the generated data through the vehicle side communication unit 21.

The service selection unit 224 generates a service list including services that are currently available by the host vehicle V based on the WSA provided from the CCH communication processing unit 22B. The service list may be stored in the memory 222.

The service list is data in which the PSIDs of the currently available services are associated with the channel numbers of the service channels to be connected to use the services. The service list may be updated every time the WSA is received. Further, the service list may be newly created every time the CCH time period is started. The service selection unit 224 executes a WSA reception related process to be described later on the basis of the service list. Among the storage areas of the memory 222, an area in which the service list is stored corresponds to a service information holding unit.

It is preferable that the information about the service currently being executed, that is, the service that has opened the corresponding service channel but a series of processes for providing and using the service is not yet completed may be held across the CCH time period.

Figure 9:
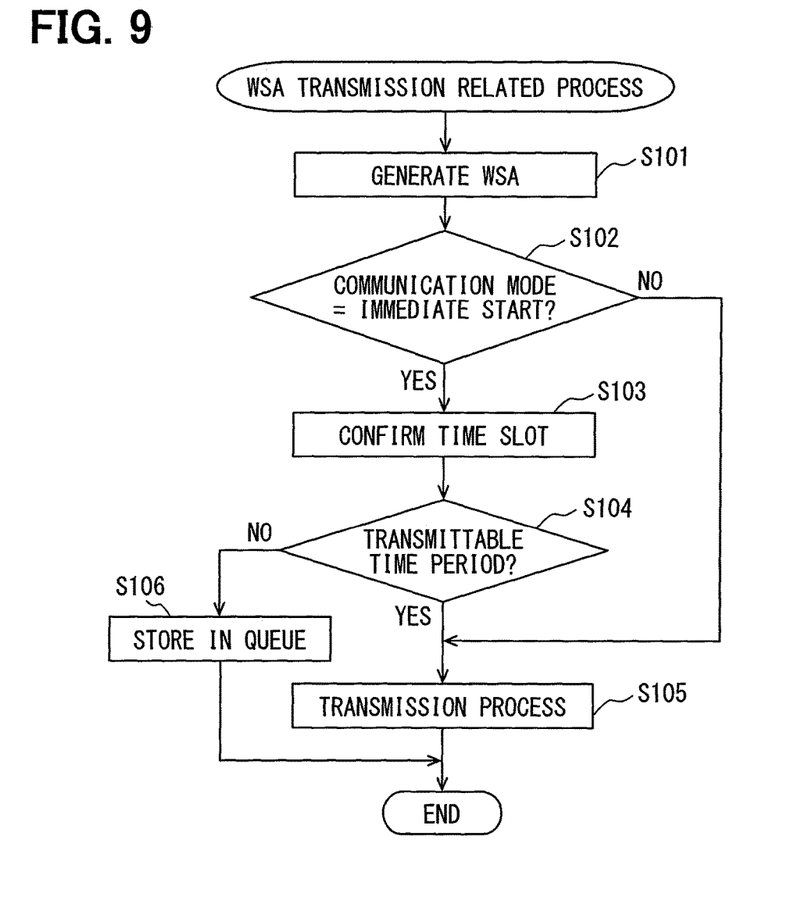
FIG. 9 is a flowchart corresponding to a WSA transmission related process.

Next, a series of processing (hereinafter referred to as a WSA transmission related process) to be executed by the service provision device 1 when the service provision device 1 transmits the WSA will be described with reference to a flowchart shown in FIG. 9. The conditions for starting the flowchart may be appropriately designed. For example, the flowchart may be started, for example, when the service provision device 1 detects approach of a vehicle on which the vehicle side device 2 is mounted. Further, the flowchart may be repeatedly executed at predetermined time intervals.

First, in Step S101, the CCH communication processing unit refers to the provision service list, generates a WSA corresponding to the service to be provided by the service provision device 1, and proceeds to Step S102. When multiple types of services are registered in the provision service list, the WSA transmission related processing for the individual services may be sequentially executed. Among the plural types of services registered in the provision service list, the service to be subjected to the WSA transmission related process may be properly determined according to a preset reference. For example, the services may be processed in order from the service at the head of the provision service list.

In Step S102, the WSA distribution control unit 12C determines whether the WSA generated by the CCH communication processing unit 22B is a WSA designating the immediate start method. In the case of the WSA of the immediate start method, an affirmative determination is made in Step S102 and the flow proceeds to Step S103. On the other hand, in the case where the WSA is not of the immediate start method, a negative determination is made in Step S102 and the flow proceeds to Step S106.

In Step S103, the WSA distribution control unit 12C confirms a position of the current time slot in the CCH time period, and proceeds to Step S104. In Step S104, the WSA distribution control unit 12C determines whether the current time slot is included in a time period (hereinafter referred to as a transmission allowable time period) which allows transmission of the WSA of the immediate start method based on a position of the time slot confirmed in Step S103.

Figure 10:
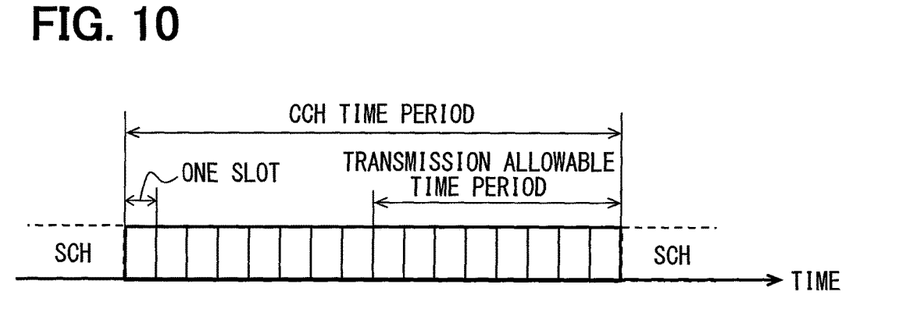
FIG. 10 is a diagram illustrating the operation of a WSA distribution control unit.

FIG. 10 is a diagram illustrating the concept of the transmission allowable time period. The transmission allowable time period is set in the CCH time period in advance. In the example shown in FIG. 10, the transmission allowable time period is set as a latter half of the CCH time period. When the CCH time period includes 16 time slots, ninth to sixteenth time slots correspond to the transmission allowable time period. Therefore, when the current time slot is one of the ninth to sixteenth time slots of the CCH time period, it is determined that the current time is included in the transmission allowable time period.

In Step S104, when it is determined that the current time is included in the transmission allowable time period, an affirmative determination is made in Step S104 and the flow proceeds to Step S105. In Step S105, the CCH communication processing unit 12B outputs the WSA generated in the present flow to the provision side communication unit 11 for transmission, and terminates the present flow. On the other hand, when it is determined that the current time is not included in the transmission allowable time period, a negative determination is made in Step S104 and the flow proceeds to Step S106.

In Step S106, the WSA of the immediate start method generated in the present flow is stored in the transmission waiting queue provided in the memory 122, and the present flow is terminated. The WSA of the immediate start method stored in the transmission waiting queue is transmitted by the CCH communication processing unit 12B when the current time falls within the transmission allowable time period with elapse of the time.

The processing from the generation to the transmission of the WSA in the service provision device 1 is set as the flow described above. As a result, the WSA employing the communication mode other than the immediate start method is transmitted as soon as the WSA is generated. On the other hand, the WSA of the immediate start method is transmitted in the transmission allowable time period (that is, the latter half of the CCH time period). In other words, at least in a first half of the CCH time period, the WSA of the immediate start method is not transmitted.

Figure 11:
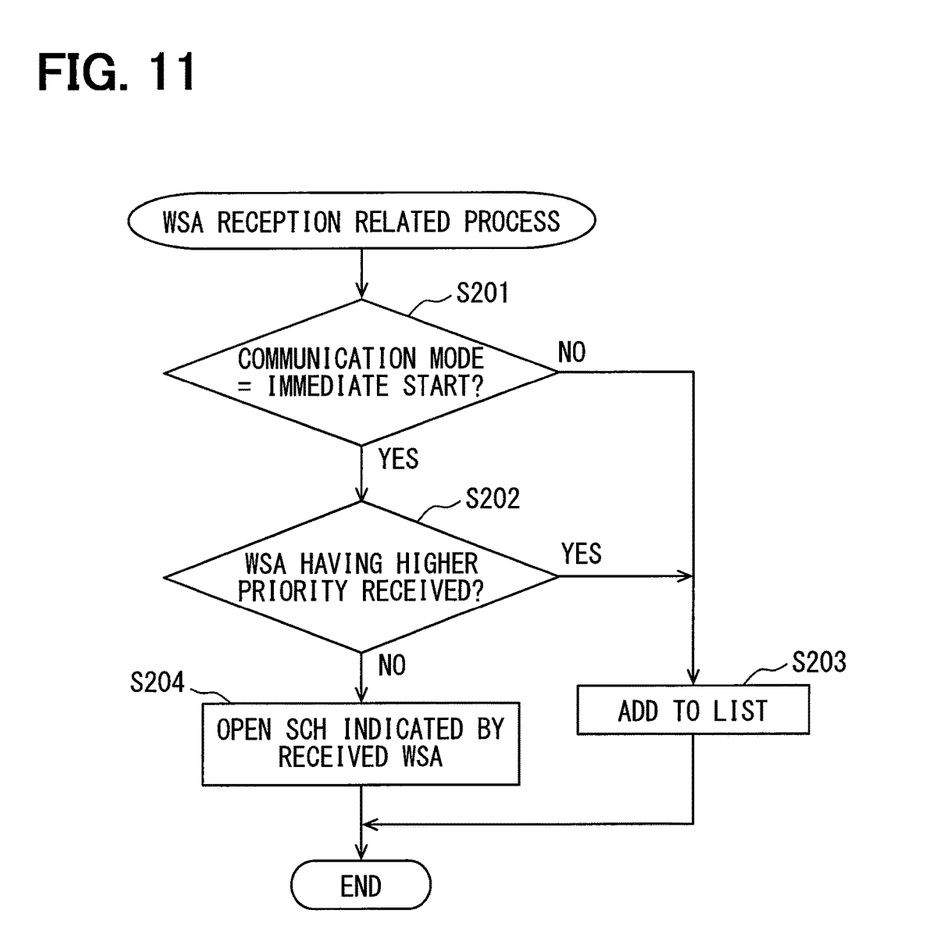
FIG. 11 is a flowchart corresponding to a WSA reception related process.

Next, a series of processes (hereinafter referred to as a WSA transmission related process) to be executed when the vehicle side device 2 transmits the WSA will be described with reference to a flowchart shown in FIG. 11. The WSA reception related process may be started when the vehicle side device 2 receives the WSA. At the start of the present flow, it is assumed that none of the service channels is open.

First, in Step S201, the SCH selection unit 22D refers to the option area of the received WSA, and determines whether the immediate start method is designated for the received WSA or not. In the case where the received WSA designates the immediate start method, an affirmative determination is made in Step S201 and the flow proceeds to Step S202. In the case where the received WSA does not designate the immediate start method, a negative determination is made in Step S201 and the flow proceeds to Step S203.

In Step S202, it is determined whether the WSA corresponding to the service having a higher priority than the received WSA service has already been received, or not, with reference to the service list. When it is determined in Step S202 that the WSA corresponding to the service with the higher priority has already been received, an affirmative determination is made in Step S202 and the process proceeds to Step S203. On the other hand, when the WSA corresponding to the higher priority service has not been received, a negative determination is made in Step S202, and the flow proceeds to Step S204.

In Step S203, information on the service indicated in the received WSA is added to the service list, and the present flow is terminated. When the CCH time period expires, the SCH selection unit 22D employs a service channel corresponding to the service with the highest priority among the services registered in the service list as the service channel to be connected in the next SCH time period. The SCH selection unit 22D notifies the communication control unit 22A of the channel number of the service channel to be connected. The communication control unit 22A opens the service channel with the notified channel number.

In Step S204, the SCH selection unit 22D instructs to open the service channel indicated in the received WSA. The communication control unit 22A switches the transmission and reception channel from the control channel to the designated service channel based on the instruction from the SCH selection unit 22D. In other words, the communication control unit 22A opens the service channel corresponding to the received WSA.

Figure 12:
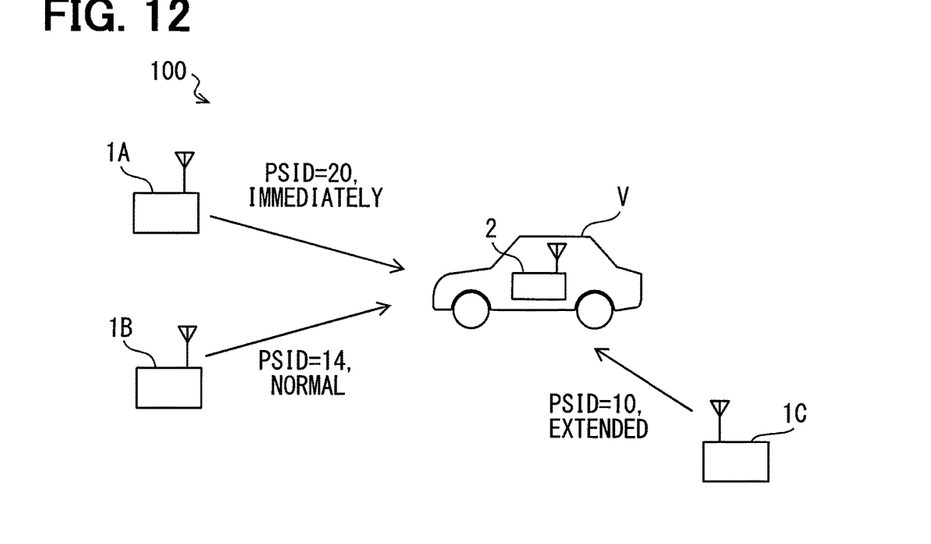
FIG. 12 is a diagram illustrating the operation of a mobile object communication system according to the present embodiment.

The operation and effects of the service provision device 1 and the vehicle side device 2 in the mobile object communication system 100 described above will be described with reference to FIG. 12. FIG. 12 illustrates a situation in which three service provision devices 1 exist around the vehicle (host vehicle) V on which the vehicle side device 2 is mounted. In the periphery area of the host vehicle V, a wireless communication under the WAVE protocol can be performed. For the sake of convenience, it is assumed that the respective reference symbols of the three service provision devices 1 are denoted by 1A, 1B, and 1C.

Each of the three service provision devices 1 corresponds to a different service, and each of the service provision devices 1 sequentially generates and transmits the WSA corresponding to the service provided by the own device.

More specifically, the service provision device 1A transmits the WSA having the PSID of 20 and designating the immediate start method as the communication mode. The service provision device 1B generates and transmits the WSA having the PSID of 14 and designating the standard method as the communication mode. The service provision device 1C generates and transmits the WSA having the PSID of 10 and designating the extension method as the communication mode.

Under such circumstances, when the transmission allowable time period is not set in the service provision device 1A (this configuration is regarded as a comparative configuration), the service provision device 1A can transmit the WSA designating the immediate start method with the use of the time slot at any position.

According to the WAVE, it is defined that the vehicle side device 2 having received the WSA designating the immediate start method promptly switches the transmission and reception channel from the control channel to the service channel indicated in the received WSA immediately upon receiving the WSA.

For that reason, in the comparative configuration, when the service provision device 1A transmits the WSA before the WSA is transmitted from the service provision devices 1B and 1C, the vehicle side device 2 cannot receive the WSA from the service provision devices 1B and 1C. As a result, in the comparative configuration, there is a possibility that the vehicle side device 2 cannot recognize that the available services are also provided by the service provision devices 1B and 1C.

According to the present embodiment, the service provision device 1 transmits the WSA designating the immediate start method at the timing included in the latter half of the control channel time period. According to this configuration, in a situation where the multiple WSAs are transmitted to the vehicle side device 2, the possibility that another WSA is transmitted after the WSA designating the immediate start method can be reduced.

Specifically, the timing at which the service provision device 1A transmits the WSA in FIG. 12 is adjusted by the WSA distribution control unit 12C so that the transmission timing is included in the latter half of the CCH time period. Therefore, the possibility that the timing at which the WSA is transmitted from the service provision devices 1B and 1C is after the timing at which the service provision device 1A transmits the WSA can be reduced. In other words, the vehicle side device 2 can reduce the possibility that the vehicle side device 2 fails to receive the WSA from the service provision devices 1B and 1C. As a result, the possibility that the vehicle side device 2 fails to recognize that the available services are also provided by the service provision devices 1B and 1C can be reduced.

In the currently used WAVE standard, the immediate start method can be set to any service. For that reason, there is a risk that the immediate start method is designated even for a service that actually does not need to execute the communication by the immediate start method originally.

In the case where the immediate start method is designated for a service that actually does not need the immediate start method, when a WSA of the service is received, another WSA corresponding to a service more important than the service that actually does not need the immediate start method cannot be received. In other words, when the WSA designating the immediate start method is received, the presence of another service with a higher importance cannot be recognized.

The present embodiment can reduce the possibility that the presence of the service with the higher degree of importance cannot be recognized due to the reception of the WSA designating the immediate start method.

When the WSA corresponding to the higher priority service has been received before the WSA designating the immediate start method, the vehicle side device 2 according to the present embodiment continues the communication using the control channel without opening the service channel indicated in the WSA designating the immediate start method. After the CCH time period expires, the vehicle side device 2 opens the service channel corresponding to the service with the highest priority.

According to the above configuration, even when the WSA designating the immediate start method is, a service having a relatively high priority can be executed preferentially.

In the above description, as an example of reception of multiple WSAs existing around at the host vehicle V, a case where multiple service provision devices 1 exist around the host vehicle V is exemplified. The present disclosure is not limited to such an example. The multiple WSAs can arrive at the host vehicle V even when one service provision device 1 provides multiple services. Even in such a case, since the same operation is conducted, the same advantages can be obtained.

When one service provision device 1 provides multiple services, it is preferable that the service provision device 1 includes multiple provision side communication units 11 corresponding to the number of the services. According to the configuration described above, the communication using the multiple service channels can be performed in parallel in one SCH time period. In other words, the multiple services can be provided at the same time. When the WSAs corresponding to the respective services are transmitted in one CCH time period, a transmission order is controlled so that the WSAs designating the immediate start method among the multiple WSAs are transmitted after transmission of other WSAs that do not designate the immediate start method.

In addition, even when one service provision device 1 provides the multiple services, the service provision device 1 may not have multiple provision side communication units 11. In the case where only one provision side communication unit 11 is provided, provision of the multiple services may be sequentially performed with the use of the multiple SCH time periods. Further, the same service channel may be allocated to the multiple services.

The embodiments of the present invention have been described above. However, the present invention is not limited to the above-described embodiments, and the following embodiments also fall within the technical scope of the present invention. Further, the present invention can be implemented with various changes without departing from the spirit of the present invention, aside from the following modifications.

(Modification 1)

Figure 13:
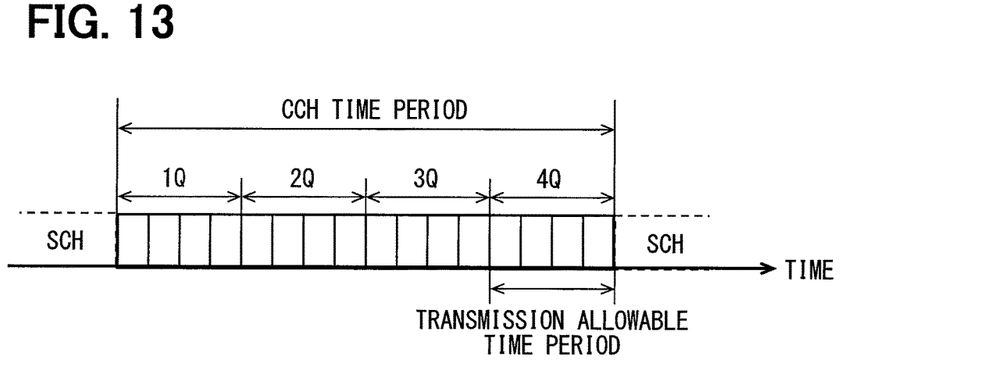
FIG. 13 is a diagram illustrating the operation of a WSA distribution control unit according to a modification of the present disclosure.

In the above description, the CCH time period is divided into tow periods of the front half and the latter half, and the latter half time period is set as the transmission allowable time period. The present disclosure is not limited to the above configuration. For example, as shown in FIG. 13, the CCH time period may be divided into four time periods (hereinafter referred to as quarters), and a last quarter of those four quarters may be set as the transmission allowable time period. It is needless to say that the number of time periods into which the CCH time period is divided is not limited to 2 or 4. The last sub time period among the individual time periods (hereinafter referred to as sub time periods) which are generated by dividing the CCH time period may be set as the transmission allowable time period.

(Modification 2)

In the embodiments and modification 1 described above, the configuration in which the transmission allowable time period of the WSA designating the immediate start method is set in the CCH time period. The present disclosure is not limited to the above configuration.

Figure 14:
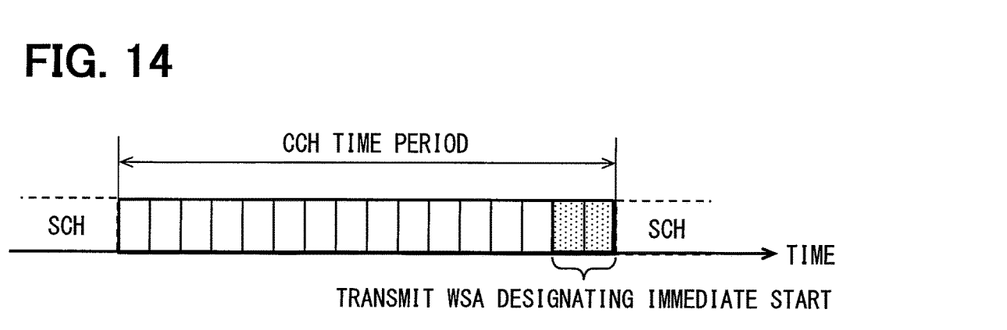
FIG. 14 is a diagram illustrating the operation of the WSA distribution control unit according to the modification of the present disclosure.

The WSA designating the immediate start method may be transmitted in the last slot of the CCH time period. When two slots are required for the transmission of the WSA designating immediate start method, the WSA may be transmitted in the last two slots as shown in FIG. 14.

(Modification 3)

In the above description, the priority for each PSID is registered in the storage 223. The SCH selection unit 22D determines whether the WSA corresponding to a service with the priority higher than that of the service of the newly received WSA has already been received in Step S202 based on the priority registered in the storage 223. The present disclosure is not limited to this configuration.

The information indicating the priority may be provided in the WSA. In that case, in step S202, the SCH selection unit 22D may determine whether the WSA corresponding to the service having the higher priority than that of the service of the newly received WSA has already been received based on the priority included in the WSA.

(Modification 4)

In the above description, a case in which the vehicle side device 2 performs the communication with the service provision device 1 according to the WAVE standard is described. A communication partner of the service provision device is not limited to the vehicle side device 2. The communication partner of the service provision device may be a mobile device carried by a pedestrian. In this case, the mobile device may have the same function as that of the vehicle side device 2 described above. The vehicle side device 2 and the mobile device correspond to a mobile object side device. Also, the vehicles and the pedestrians correspond to mobile objects.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A mobile object communication system comprising:
a mobile object side device configured to be used in a vehicle or carried by a user; and
a service provision device located outside of the vehicle and the user, wherein
the mobile object side device and the service provision device perform a communication in wireless manner using a control channel and a plurality of service channels, the control channel and the plurality of service channels are defined by different frequencies from one another, a time period in which the communication using the control channel is performed is defined as a control channel time period, a time period in which the communication using each of the plurality of service channels is performed is defined as a service channel time period, and the control channel time period and the service channel time period are set to be alternately switched,
the service provision device comprises:
a provision side storage that stores a provision device program performing the communication with the mobile object side device and providing a predetermined service using one of the plurality of service channels; and
a provision side processor that executes the provision device program transmitting, using the control channel, service start information indicating the one of the plurality of service channels used in the communication for providing the predetermined service, the service start information including information required for starting the communication between the service provision device and the mobile object side device using the one of the plurality of service channels,
the service provision device designates, in the service start information, a communication method of the communication with the mobile object side device using the one of the plurality of service channels,
the communication method includes a standard communication method and an immediate start method,
in the standard communication method, the service provision device starts the communication with the mobile object side device using the one of the plurality of service channels at a start time of the service channel time period,
in the immediate start method, the service provision device controls the mobile object side device to immediately start the communication using the one of the plurality of service channels as soon as the mobile object side device receives the service start information,
the provision side processor transmits the service start information designating the immediate start method in a latter half of the control channel time period,
the service provision device is configured to transmit, in one control channel time period, multiple pieces of the service start information corresponding to multiple services having different types, and
when transmitting the multiple pieces of the service start information, the service provision device transmits one of the multiple pieces of the service start information which designates the immediate start method after transmitting all of the remaining pieces of the service start information which do not designate the immediate start method.

2. The mobile object communication system according to claim 1, wherein
the control channel time period is divided into a plurality of time slots, and
the service provision device transmits the service start information that designates the immediate start method in a last time slot among the plurality of slots included in the control channel time period.

3. The mobile object communication system according to claim 1, wherein
the mobile object side device comprises:
a mobile object side storage that stores a mobile object program that acquires the service start information transmitted from the service provision device using the control channel; and
a mobile object side storage that stores a mobile object program that communicates with the service provision device using the one of the plurality of service channels which is indicated by the service start information; and
a memory that holds the service start information, which is acquired by the storage that stores a mobile object program in the control channel unit in the control channel time period,
the mobile object side device is configured to receive, in one control channel time period, multiple pieces of the service start information corresponding to multiple services, and
when one of the multiple pieces of the service start information designates the immediate start method, the mobile object side processor that executes the mobile object program acquires another one of the multiple pieces of the service start information which corresponds to the service having a higher priority than the service corresponding to the one of the multiple pieces of the service start information which designates the immediate start method, and then the processor that executes the mobile object program starts the communication using one of the plurality of service channels related to the service having the higher priority after the control channel time period expires.

4. A service provision device that performs a communication in wireless manner with a mobile object side device configured to be used in a vehicle or carried by a user, wherein the service provision device is located outside of the vehicle and the user, the service provision device is used in a mobile object communication system in which the mobile object side device and the service provision device perform the communication in wireless manner using a control channel and a plurality of service channels, the control channel and the plurality of service channels are defined by different frequencies from one another, a time period in which the communication using the control channel is performed is defined as a control channel time period, a time period in which the communication using each of the plurality of service channels is performed is defined as a service channel time period, and the control channel time period and the service channel time period are set to be alternately switched, the service provision device comprising:
a provision side storage that stores a provision device program performing the communication with the mobile object side device and providing a predetermined service using one of the plurality of service channels; and
a provision side processor that executes the provision device program transmitting, using the control channel, service start information required for starting the communication between the service provision device and the mobile object side device using the one of the plurality of service channels,
wherein
the service provision device designates, in the service start information, a communication method of the communication with the mobile object side device using the one of the plurality of service channels,
the communication method includes a standard communication method and an immediate start method,
in the standard communication method, the service provision device starts the communication with the mobile object side device using the one of the plurality of service channels at a start time of the service channel time period,
in the immediate start method, the service provision device controls the mobile object side device to immediately start the communication using the one of the plurality of service channels as soon as the mobile object side device receives the service start information,
the provision side processor transmits the service start information designating the immediate start method in a latter half of the control channel time period,
the service provision device is configured to transmit, in one control channel time period, multiple pieces of the service start information corresponding to multiple services having different types, and
when transmitting the multiple pieces of the service start information, the service provision device transmits one of the multiple pieces of the service start information which designates the immediate start method after transmitting all of the remaining pieces of the service start information which do not designate the immediate start method.

* * * * *